United States Patent [19]
Vettel

[11] 4,306,380
[45] Dec. 22, 1981

[54] PROTECTIVE STRIP FOR AN OUTWARDLY SWIVELABLE FLANGE OF A DOOR, HOOD, OR THE LIKE OF A MOTOR VEHICLE

[75] Inventor: Karl Vettel, Hirschlanden, Fed. Rep. of Germany

[73] Assignee: Dr. Ing. h.c.F. Porsche Aktiengesellschaft, Stuttgart, Fed. Rep. of Germany

[21] Appl. No.: 93,908

[22] Filed: Nov. 13, 1979

[30] Foreign Application Priority Data

Nov. 10, 1978 [DE] Fed. Rep. of Germany ....... 2848762

[51] Int. Cl.³ .............................................. E06B 7/16
[52] U.S. Cl. ..................................... 49/490; 296/146; 428/358
[58] Field of Search .................. 428/358, 122; 52/717, 52/716, 718; 49/462, 490; 296/146, 152

[56] References Cited

U.S. PATENT DOCUMENTS

| | | | |
|---|---|---|---|
| 1,958,115 | 5/1934 | Schlegel | 428/122 |
| 2,606,635 | 8/1952 | Clingman | 52/716 X |
| 2,610,713 | 9/1952 | Bradley | 52/717 X |
| 2,671,541 | 3/1954 | Kramer | 52/716 X |
| 2,698,072 | 12/1954 | Beck | 52/716 X |
| 2,740,658 | 4/1956 | Kesich | 49/462 |
| 2,763,345 | 9/1956 | Clingman et al. | 52/716 X |
| 3,363,364 | 1/1968 | Cadioce | 52/716 X |
| 3,371,447 | 3/1968 | Ruff et al. | 52/716 X |
| 3,381,988 | 5/1968 | Dewar | 52/716 |
| 3,462,903 | 8/1969 | Kronbetter | 428/358 X |
| 3,494,075 | 2/1970 | Kunevicius | 52/716 X |
| 3,638,359 | 2/1972 | Kruschwitz | 428/122 X |
| 3,837,957 | 9/1974 | Mesnel | 52/716 X |
| 4,015,398 | 5/1977 | Bright | 52/716 |
| 4,042,741 | 8/1977 | Bright | 428/122 X |
| 4,114,320 | 9/1978 | Pullan | 428/122 X |
| 4,165,083 | 8/1979 | Dochnahl | 52/718 X |

*Primary Examiner*—Lorraine T. Kendell
*Attorney, Agent, or Firm*—Craig and Antonelli

[57] ABSTRACT

A protective strip arrangement is provided for an outwardly swivelable flange of a door, hood, or the like of a motor vehicle. The strip is formed of elastic material and is held in position on the flange, with the flange forming a stepped shoulder with respect to the adjacent wall of the door, hood, or the like. In order to provide an uninterrupted appearance and configuration at the strip and the flange, the strip is dimensioned to completely fill in the stepped shoulder portion. Particularly preferred embodiments, the protective strip is formed L-shaped in cross section. In other preferred embodiments, the protective strip fits around the flange in a manner of a pair of pincers.

18 Claims, 2 Drawing Figures

PROTECTIVE STRIP FOR AN OUTWARDLY SWIVELABLE FLANGE OF A DOOR, HOOD, OR THE LIKE OF A MOTOR VEHICLE

BACKGROUND AND SUMMARY OF THE INVENTION

The invention relates to a protective strip for an outwardly swivelable flange of a door, hood, or the like of a motor vehicle, said strip consisting of an elastic material and being held in place on the flange.

A protective strip of this type is shown in German utility model No. 72 36 582, which strip fits around the flange in the manner of a clamp, i.e., with two legs. This design has the disadvantage that the shoulder which runs along the outer wall projects above or outwardly of the latter, and therefore can be subjected to such stress by the rotating brushes of an automatic car wash that the protective strips are torn off the vehicle. In addition, the protective strip is not integrated in the outwardly swivelable part of the vehicle body by this design, and this has a disadvantageous effect upon its aesthetic appearance, especially when there are differences in color between the vehicle and the protective strip.

A goal of the invention is to arrange and design a protective strip such that the abovementioned disadvantages are avoided.

According to the invention, this goal is achieved by providing that the flange forms a stepped shoulder with respect to a wall of the door frame or the like, said projection being filled by a segment of the protective strip. It is advantageous in this regard according to preferred embodiments of the invention to construct the protective strip L-shaped in cross section. In embodiments where protective strip fits around the flange in the manner of a pair of pincers, it is advantageous for the section of the protective strip located inside the flange to be provided with a sealing lip, said lip cooperating with a doorpost. The protective strip produces a cavity in the free area which is located away from the edge of the flange. In addition, the strip is preferably painted the color of the vehicle.

The principal goals achieved by the invention lie in the fact that the protective strip does not project beyond the outwardly swivelable body parts such as the door, hood, or the like, so that undesirable detachment of the protective strip, for example, in a car wash, is avoided. Moreover, the protective strip is so integrated into the body that a positive aesthetic effect is ensured.

These and further objects, features and advantages of the present invention will become more obvious from the following description when taken in connection with the accompanying drawings which show, for the purposes of illustration only, a single embodiment in accordance with the present invention.

DETAILED DESCRIPTION OF THE INVENTION

Figure 1:
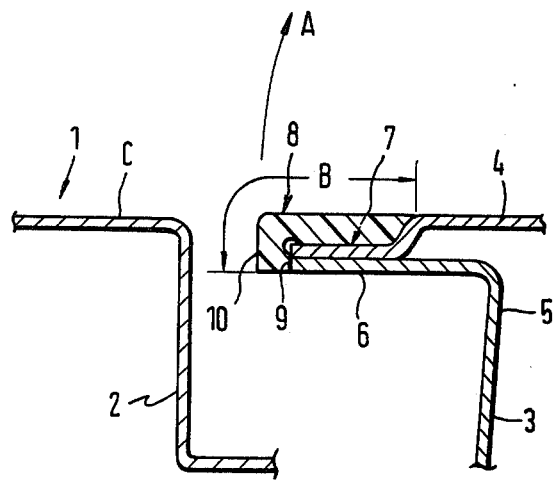
FIG. 1 is a partial horizontal sectional view through a side wall of a motor vehicle in the vicinity of a doorpost and a door and showing a first preferred embodiment of the invention and FIG. 2 is a view corresponding to FIG. 1, showing another preferred embodiment of the invention.

Side wall 1, in the area shown, comprises a doorpost 2 and a door 3, said door being so articulated on a hinge, not shown, that it opens in the direction of the arrow A.

Door 3 is formed by an outer wall 4 and an inner wall 5, said walls being assembled to form a flange 6 by welding, cementing, or the like.

Flange 6 forms a stepwise shoulder 7 with respect to wall 4, said shoulder being filled with a protective strip 8 made of elastic material, for example, polyurethane, or with a section thereof, in such manner that the normal external shape of wall 4 continues uninterrupted.

For this purpose, protective strip 8 is made L-shaped in cross section, whereby the leading edge 9 of flange 6 is also covered by a leg 10 of protective strip 8.

In order to prevent protective strip 8 from having a disturbing influence on the aesthetic appearance, it is painted at least in area B with the same color as the outside C of the vehicle.

If desired, protective strip 8 can extend circumferentially along the edge of a hood and/or a door (below the window frame).

Figure 2:
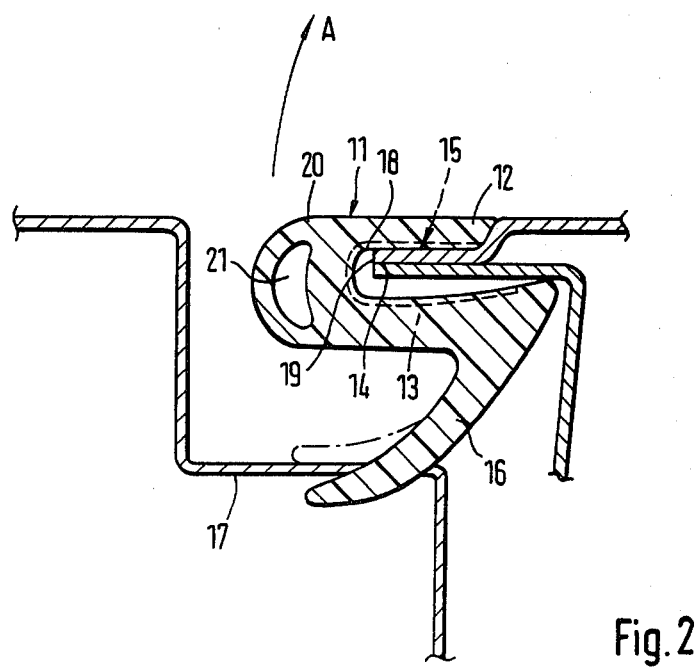

According to the embodiment of FIG. 2, protective strip 11 has segments 12 and 13 which fit around flange 14 in the manner of a pair of pincers. Segment 12 likewise fills the stepped shoulder 15 of flange 14. A sealing lip 16 is provided on section 13, said lip cooperating in a sealing manner with doorpost 17.

Protective strip 11 is held in place by a spring element 18, running inside sections 12 and 13, said element being connected with these segments and abutting flange 14 in a spring-tensioned manner.

Protective strip 11 has a cavity 21 and 20, remote from the edge 19 of flange 14. This gives the protective strip additional flexibility, or resiliency, in this area.

While we have shown and described several embodiments in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

We claim:

1. Protective strip arrangement for an outwardly swivelable flange of a motor vehicle, comprising a protective strip consisting of elastic material and being held in position on the flange, wherein the flange forms a stepped shoulder with respect to an adjacent body part of the motor vehicle, said shoulder on its outer wall being filled by a segment of said protective strip, whereby said protective strip does not project beyond said adjacent body part of the motor vehicle.

2. Protective strip arrangement according to claim 1, wherein the protective strip is made L-shaped in cross section, with one leg of the L-shaped strip being said segment of said protective strip, and the other leg of the L-shaped strip covering the leading edge of the flange.

3. Protective strip arrangement according to claim 1, wherein the protective strip fits around the flange in the manner of a pair of pincers, and wherein a segment of the protective strip adjacent one portion of the flange is provided with a sealing lip, said sealing lip cooperating with another adjacent body part of the motor vehicle.

4. Protective strip arrangement according to claim 3, or 1 wherein the protective strip has a cavity in the free area located remotely from the edge of the flange to increase the resiliency thereof.

5. Protective strip arrangement according to claim 1 or claim 3 wherein the protective strip is painted the color of the vehicle.

6. Protective strip arrangement according to claim 1, 2 or 3, wherein the body part of the motor vehicle is a door or hood.

7. Protective strip arrangement according to claim 1, wherein said elastic material is polyurethane.

8. Protective strip arrangement according to claim 1, 2, 3 or 4, wherein the shoulder is filled by said segment of protective strip in such a manner that the external shape of the adjacent body part continues substantially uninterrupted.

9. Protective strip arrangement according to claim 5, wherein the shoulder is filled by said segment in such a manner that the external shape of the adjacent body part continues substantially uninterrupted.

10. Protective strip arrangement according to claim 3, wherein said segment of the protective strip adjacent one portion of the flange is a segment different than the segment that fills the shoulder.

11. Protective strip arrangement according to claim 10, wherein the body part adjacent the stepped shoulder is a door, and said another adjacent body part is a doorpost, whereby said sealing lip cooperates in a sealing manner with said doorpost.

12. Protective strip arrangement according to claim 3 or 11, further including a spring element positioned inside the protective strip to force the protective strip against the flange in a spring-tensioned manner.

13. Protective strip arrangement according to claim 12, wherein the protective strip has a cavity in the free area located remotely from the edge of the flange to increase the resiliency thereof.

14. An outwardly swivelable body part of a motor vehicle, having at one edge thereof a flange, and a protective strip, said protective strip consisting of elastic material and being held in position on the flange, wherein the flange forms a stepped shoulder on its outer wall with respect to the adjacent portion of the outwardly swivelable body part, said shoulder being filled by a segment of said protective strip, whereby said protective strip does not project beyond said adjacent portion of the outwardly swivelable body part.

15. Body part according to claim 14, wherein said flange is outwardly swivelable with said outwardly swivelable body part.

16. Body part according to claim 14, wherein the protective strip is made L-shaped in cross section, with one leg of the L-shaped strip being said segment of said protective strip, and the other leg of the L-shaped strip covering the leading edge of the flange.

17. Body part according to claim 14, wherein the protective strip fits around the flange in the manner of a pair of pincers, and wherein a segment of the protective strip adjacent one portion of the flange is provided with a sealing lip, said sealing lip cooperating with another adjacent body part of the motor vehicle.

18. Body part according to claim 14, 16 or 17, wherein said shoulder is filled by said segment in such a manner that the external shape of the adjacent portion of the outwardly swivelable body part continues substantially uninterrupted.

* * * * *